United States Patent
Kanayama et al.

(10) Patent No.: US 11,080,313 B2
(45) Date of Patent: Aug. 3, 2021

(54) RECOMMENDATION TECHNIQUE USING AUTOMATIC CONVERSATION

(71) Applicant: INTERNATIONAL BUSINESS MACHINES CORPORATION, Armonk, NY (US)

(72) Inventors: Hiroshi Kanayama, Kanagawa-ken (JP); Kentarou Fukuda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 15/926,331

(22) Filed: Mar. 20, 2018

(65) Prior Publication Data
US 2019/0294693 A1    Sep. 26, 2019

(51) Int. Cl.
*G06F 16/332* (2019.01)

(52) U.S. Cl.
CPC ...... *G06F 16/3322* (2019.01); *G06F 16/3329* (2019.01)

(58) Field of Classification Search
CPC ................. G06F 17/306544; G06F 17/3064
USPC ............................................... 707/767
See application file for complete search history.

(56) References Cited

U.S. PATENT DOCUMENTS

| | | | |
|---|---|---|---|
| 8,639,517 B2 | 1/2014 | Di Fabbrizio et al. | |
| 9,471,668 B1 * | 10/2016 | Alupului | G06N 3/006 |
| 9,679,568 B1 | 6/2017 | Taubman et al. | |
| 9,697,206 B2 | 7/2017 | Johnston et al. | |
| 10,262,062 B2 * | 4/2019 | Chang | G06F 16/3329 |
| 2003/0041054 A1 * | 2/2003 | Mao | G06F 16/951 |
| 2008/0201304 A1 * | 8/2008 | Sue | G06F 16/338 |
| 2010/0153357 A1 * | 6/2010 | Slackman | G06F 16/334 |
| | | | 707/707 |

(Continued)

OTHER PUBLICATIONS

Ferrucci, "Introduction to 'This is Watson'", IBM Journal of Research and Development, vol. 56; Issue 3, May 2012, pp. 235-249.

(Continued)

*Primary Examiner* — Hosain T Alam
*Assistant Examiner* — Robert F May
(74) *Attorney, Agent, or Firm* — Tutunjian & Bitetto, P.C.; Randall Bluestone

(57) ABSTRACT

A computer-implemented method, computer program product, and system are provided for providing a recommendation. The method includes receiving, by a conversation system, a query from a user. The method also includes inputting the query into an intent-entity model to obtain a first output. The method further includes inputting the query into a question-answering system to obtain a second output. The method additionally includes analyzing the first output from the intent-entity model to calculate a value of degree of ambiguity of the first output to the query. The method also includes analyzing the query and the second output from the question-answering system to calculate a value of extent of satisfaction to which the second output satisfies the query. The method further includes determining one or more recommendations using the degree of ambiguity and the extent of satisfaction. The method additionally includes outputting the one or more recommendations to the user.

15 Claims, 4 Drawing Sheets

(56) References Cited

U.S. PATENT DOCUMENTS

2014/0280292 A1\* 9/2014 Skinder .............. G06F 16/3338
707/767

OTHER PUBLICATIONS

"Watson Conversation", https://www.ibm.com/watson/services/conversation/, Dec. 14, 2017, pp. 1-10.
"Luis: Homepage", file:///Users/etsukohata/Downloads/LUIS_Homepage.html; Dec. 14, 2017, pp. 1-5.

\* cited by examiner

RECOMMENDATION TECHNIQUE USING AUTOMATIC CONVERSATION

BACKGROUND

Technical Field

The present invention relates to recommendation technique using automatic conversation.

Description of the Related Art

Recently, various techniques have been known regarding conversation systems (or chatbots) based on an Intent-Entity model that provides services through automatic conversation with an end user(s). On the other hand, the Intent-Entity model generally requires improvements in derivation of recommendation candidates based on complicated conditions included in a query. The improvements demand a huge amount of training data. This requires enormous computational resources, such as processing power, memory, etc.

SUMMARY

According to an embodiment of the present invention, there is provided a computer-implemented method for providing a recommendation. The method includes receiving at a conversation system a query from a user. The method further includes inputting the query into an intent-entity model to obtain a first output. The method further includes inputting the query into a question-answering system to obtain a second output. The method further includes analyzing the first output from the intent-entity model to calculate a value of degree of ambiguity of the first output to the query. The method further includes analyzing the query and the second output from the question-answering system to calculate a value of extent of satisfaction to which the second output satisfies the query. The method further includes determining one or more recommendations using the degree of ambiguity and the extent of satisfaction. The method further includes outputting the one or more recommendations to the user According to another embodiment of the present invention, there is provided a recommendation system. The recommendation system includes a receiver, a conversation processor, a question-answering processor, an analyzer, a determinator, and an outputter. The receiver receives a query from a user. The conversation processor applies an intent-entity model and outputs a first output based on the query. The question-answering processor outputs a second output based on the query. The analyzer analyzes the first output from the conversation processor to calculate a value of degree of ambiguity of the first output to the query. The analyzer analyzes the query and the second output from the question-answering processor to calculate a value of extent of satisfaction to which the second output satisfies the query. The determinator determines one or more recommendations using the degree of ambiguity and the extent of satisfaction. The outputter outputs the one or more recommendations to the user.

According to yet another embodiment of the present invention, there is provided a computer program product for providing a recommendation. The computer program product includes a computer readable storage medium having program instructions embodied therewith. The program instructions are executable by a computer to cause the computer to perform the aforementioned method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Figure 1:
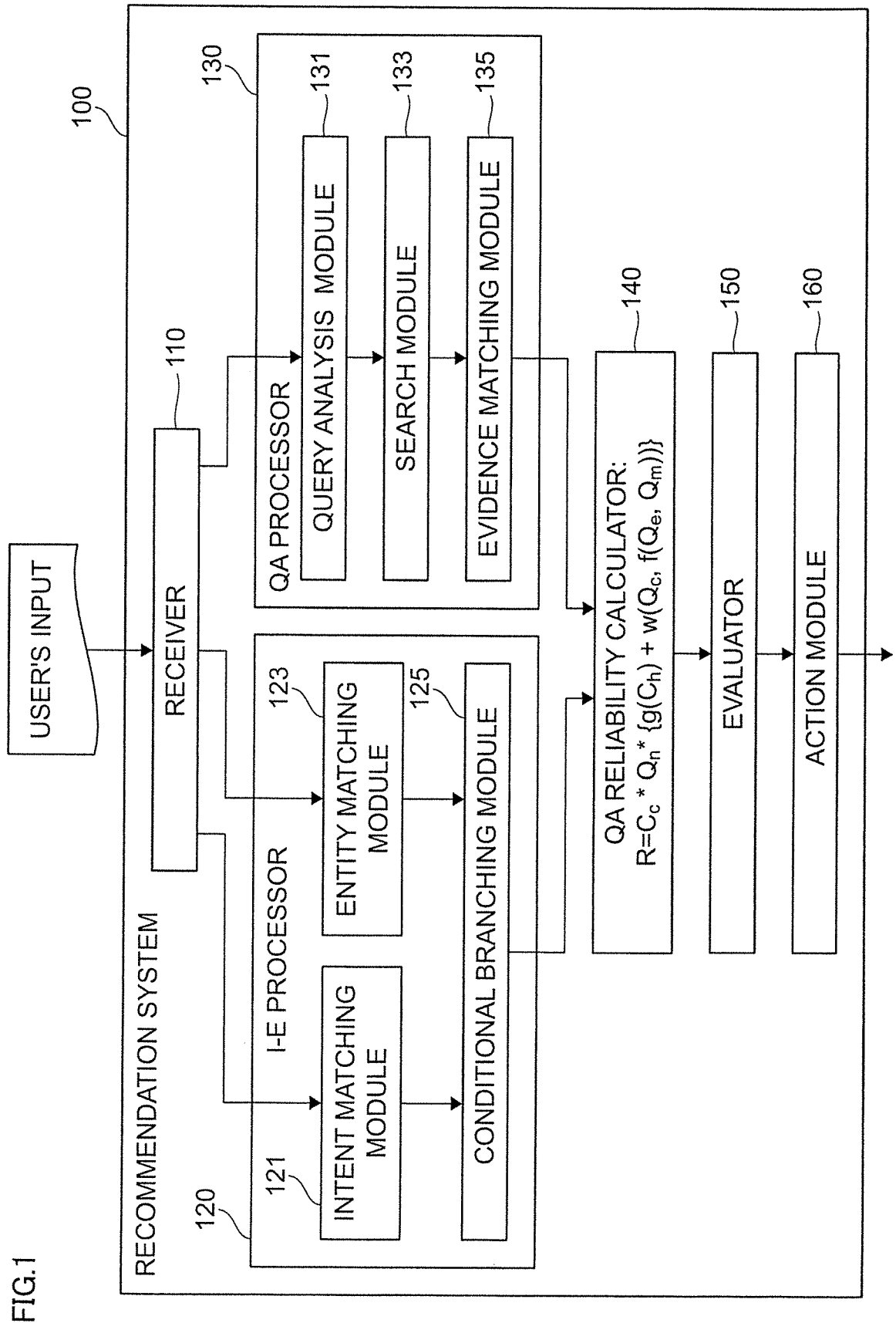
FIG. 1 depicts a schematic view of a configuration of a recommendation system according to an exemplary embodiment of the present invention.

FIG. 1 depicts a schematic view of a configuration of a recommendation system 100 according to an exemplary embodiment of the present invention.

The recommendation system 100 is configured to provide services through automatic conversation with an end user(s). In the present exemplary embodiment, the recommendation system 100 recommends shops (restaurants) or items to the user, through free conversation with the user.

The user can freely talk to the recommendation system 100. For example, the user may ask for recommended restaurants, and may only give greetings to the recommendation system 100. For covering broad utterances by the user, the recommendation system 100 integrates a Question Answering (QA) system into an automated dialog system (a conversation system using an Intent-Entity (I-E) model, described later).

The recommendation system 100 may include a receiver 110, an I-E processor 120, a QA processor 130, a QA reliability calculator 140, an evaluator 150, and an action module 160.

The receiver 110 receives a user's input in natural language. In other words, the receiver 110 receives a query from the user. In the present exemplary embodiment, the receiver 110 acquires a user's input as text data, i.e. an input sentence(s) inputted by the user. Note that the receiver 110 can acquire a user's input using speech recognition.

The I-E processor 120 processes the input sentence using an I-E model. In other words, the I-E processor 120 identifies intent and entities from the input sentence to reply to the user. Hereinafter the I-E model may be referred to as the I-E processor 120. In the present exemplary embodiment, the I-E processor 120 may include an intent matching module 121, an entity matching module 123, and a conditional branching module 125. The intent matching module 121 identifies the intent of the user from the input sentence. Specifically, the intent matching module 121 classifies the intent by matching the identified intent with a list of intents prepared in advance. The list of the intents may be stored in an intent database (not shown). Note that the intent database may be provided in the intent matching module 121 or in other places. The entity matching module 123 identifies the entities from the input sentence. The entities are things, i.e. words, related to the identified intent. The entity matching module 123 classifies the entities by matching the identified entities with a list of entities prepared in advance. The list of the entities may be stored in an entity database (not shown). Note that the entity database may be provided in the entity matching module 123 or in other places. The conditional branching module 125 conducts conditional branching to recommend one or more things (e.g. restaurants) or output actions other than recommendation (e.g. reply to greetings from the user). In the present exemplary embodiment, the conditional branching module 125 outputs (returns) dialogue text, recommendations, intents with confidence factors, entities, possible candidates (recommendation candidates). Here, the intent matching module 121 may calculate the confidence factor. The confidence factor can be regarded as criteria for evaluating options. For example, the confidence factor of the recommendation candidate represents an evaluation score for the recommendation candidate. Note that the I-E processor 120 is an example of the claimed conversation processor. The confidence factor outputted from the conditional branching module 125 is an example of the claimed first confidence factor.

The QA processor 130 processes the input sentence using a QA system. In other words, the QA processor 130 interprets the input sentence (e.g. a question), retrieves an appropriate answer(s) from an information source, and finds evidences of the answer through matching of the question and the information source. Hereinafter the QA system may be referred to as the QA processor 130. In the present exemplary embodiment, the QA processor 130 may include a query analysis module 131, a search module 133, and an evidence matching module 135. The query analysis module 131 analyses the query (the question). In the present exemplary embodiment, the query analysis module 131 counts a number of conditions extracted from the query (user's input). Settings for extracting the conditions are prepared in advance, and the query analysis module 131 extracts the conditions according to the extracting settings. Note that the extracting settings may be determined from existing techniques according to the system's policy. The search module 133 retrieves an appropriate answer(s) to the question from the information source. Specifically, the search module 133 retrieves a recommendation candidate(s) for the query from a QA database (not shown). Note that the QA database may be provided in the search module 133 or in other places. In the present exemplary embodiment, the search module 133 counts a number of conditions that the top recommendation candidate satisfies. The top recommendation candidate is defined as the most recommended candidate among the recommendation candidates. Settings for determining the satisfied conditions are prepared in advance, and the search module 133 determines the satisfied conditions according to the determining settings. Note that the determining settings may be determined from existing techniques according to the system's policy. The evidence matching module 135 finds evidences of the recommendation candidate(s) through matching of the question and the recommendation candidate stored in the QA database. In the present exemplary embodiment, the evidence matching module 135 outputs (returns) recommendation candidates with confidence factors (confidence scores), reasons for the recommendation, the number of conditions extracted from the user's input, and the number of conditions that the top recommendation candidate satisfies. In the present exemplary embodiment, the evidence matching module 135 can display the evidence of matching, while a general conversation flow cannot display the evidence of matching. Note that the QA processor 130 is an example of the claimed question-answering system. The confidence factor outputted from the evidence matching module 135 is an example of the claimed second confidence factor. The number of the conditions extracted from the query is an example of the claimed complexity of the query.

The QA reliability calculator 140 calculates a QA reliability score based on the outputs from the I-E processor 120 and the QA processor 130. Details of the calculation of the QA reliability score will be described later. Note that the QA reliability calculator 140 is an example of the claimed calculator.

The evaluator 150 evaluates the outputs from the I-E processor 120 and the QA processor 130 using the QA reliability score calculated by the QA reliability calculator 140. In the present exemplary embodiment, the evaluator 150 compares the QA reliability score with multiple thresholds (thresholds T1, T2, described later). Further, the evaluator 150 determines the recommendation candidate(s) using the outputs from the I-E processor 120 and/or the QA processor 130 based on the QA reliability score. Note that the evaluator 150 is an example of the claimed determinator.

The action module 160 conducts actions such as recommending a restaurant, navigating the user to the restaurant, and replying to greetings from the user. For example, the action module 160 outputs a voice to read out the recommended restaurant using text to speech.

In the recommendation system 100, the I-E processor 120 and the QA processor 130 may perform processing in parallel. The recommendation system 100 then conducts actions selectively using the outputs from the I-E processor 120 and the QA processor 130 based on the QA reliability score.

Note that neither of the conversation system nor the QA system can perfectly answer the question because the user's input is unpredictable beforehand, and the user's input may contain noises such as those due to errors in speech recognition. Also it is difficult to rely on supervised learning methods due to a limited number of training data, i.e. the pairs of a user's query and a target of recommendation.

Here, the I-E processor 120 is generally appropriate for enumeration of recommendation candidates. On the other hand, the I-E processor 120 generally requires improvements in derivation of recommendation candidates based on complicated conditions included in the query. This may increase manufacturing cost of the recommendation system 100.

The QA processor 130 is generally appropriate for derivation of recommendation candidates based on complicated conditions included in the query. Further, the QA processor 130 have capability to output the confidence of recommending decision from analysis of multiple viewpoints, and to show the reason for the decision. On the other hand, the QA processor 130 generally requires improvements in judgment whether the user's input is suitable for the QA system. Further, the QA systems generally do not guarantee to provide plausible outputs when the query does not include appropriate conditions and when the words and phrases in the query do not match those in the information source.

In the present exemplary embodiment, the basic conversation flow is designed using the output from the I-E processor 120, so that developers of the recommendation system 100 can design the recommendation system 100 to adopt it to a specific domain and to cover broad utterances by the users.

Hereinafter, the QA reliability score will be described in detail. The QA reliability score can be regarded as criteria for determining to use the output from the I-E processor 120 (I-E model's recommendation) and/or the output from the QA processor 130 (QA system's recommendation). In other words, the QA reliability score can be regarded as a score of the QA system's recommendation that is calculated by using analysis results from both of the I-E model based conversation system and the QA system. Note that the I-E model's recommendation is an example of the claimed first output. The QA system's recommendation is an example of the claimed second output.

The QA reliability score (score R) is derived by a QA reliability function. The QA reliability function returns a high score when the QA system's recommendation is considered appropriate. Further, the QA reliability function returns a low score when the I-E model's recommendation is considered appropriate.

Specifically, the QA reliability function can be defined as a function of parameters $C_h$, $C_c$, $Q_n$, $Q_c$, $Q_m$, $Q_e$. The parameter $C_h$ is a number of the I-E model's recommendations. The parameter $C_c$ is a confidence factor of the QA system derived from the I-E model that indicates whether the user's input is suitable for the QA system or not. Multiple values may be prepared for the parameter $C_c$ in advance and each value may be associated with a possible intent. The value to be set as the parameter $C_c$ is then determined based on the intent outputted from the conditional branching module 125. In the present exemplary embodiment, $C_c=0$ represents that the user's input is unsuitable for the QA system, and $C_c=1$ represents that the user's input is suitable for the QA system. The parameter $Q_n$ is a constant that indicates existence or non-existence of the QA system's recommendation. In the present exemplary embodiment, $Q_n=0$ represents the non-existence of the QA system's recommendation, and the $Q_n=1$ represents the existence of the QA system's recommendation. The parameter $Q_c$ is a confidence factor of the QA system derived from the QA system itself. For example, the parameter $Q_c$ is a confidence factor of the top recommendation candidate. The parameters $Q_{c1}$, $Q_{c2}$, . . . are confidence factors of each QA system's recommendation. The parameter $Q_e$ is the number of conditions extracted from the user's input. That is, the parameter $Q_e$ is complexity of the user's input (query). The parameter $Q_e$ is then determined based on the number of conditions (e.g. important keywords or concepts) as the output of the query analysis module 131. The parameter $Q_m$ is a number of conditions that the QA system's representative recommendation satisfies. For example, the parameter $Q_m$ is the number of conditions that the top recommendation candidate satisfies, which is determined based on the outputs from the evidence matching module 135. The parameters $Q_{m1}$, $Q_{m2}$, . . . are numbers of conditions that each QA system's recommendation satisfies.

Note that the QA reliability function meets the conditions below: the score R becomes zero (0) when the QA processor 130 (the QA system) does not return any QA system's recommendation ($Q_n=0$); the score R increases as the complexity of the user's input (the parameter $Q_e$) increases; the score R increases as a concordance level (level L, described later) of the QA system's recommendation increases; the score R decreases as the parameter $C_h$ decreases (except the case of $C_h=0$, described later); and the score R decreases as the parameter $C_c$ decreases (described later).

Here, the level L can be defined as a function of the parameter $Q_e$ and the parameter $Q_m$ and meets the conditions below: the level L increases as a satisfaction rate ($Q_m/Q_e$) increases; the level L increases as the parameter $Q_e$ increases even where satisfaction rates ($Q_m/Q_e$) are identical; the level L decreases as the parameter $Q_e$ increases in a case where the parameters $Q_m$ are identical. Note that the satisfaction rate ($Q_m/Q_e$) is an example of the claimed extent of satisfaction.

The score R of the QA reliability function may be determined based on the system's policy when the I-E processor 120 (the I-E model) does not return any recommendations ($C_h=0$). For example, if the recommendation system 100 allows false-positive and is wanted to return a sort of recommendation whenever possible, the QA reliability function returns a high score R in the case of $C_h=0$. If the recommendation system 100 does not prefer the false-positive and is wanted to reduce wrong recommendations, the QA reliability function returns a low score R in the case of $C_h=0$.

As mentioned above the score R decreases as the parameter $C_c$ decreases. For example, the smaller parameter $C_c$ indicates that the user's input is less suitable for the QA processor 130 (the QA system).

Note that the QA reliability function that calculates the QA reliability score R can be defined as follows:

$$R=C_c*Q_n*\{g(C_h)+w(Q_c,f(Q_e,Q_m))\}$$

The function f derives the level L. For example, $f(Q_e, Q_m)=(Q_m^3/Q_e)$. The function w is a function that weights the parameter $Q_c$ and the level L. For example, $w(a, b)=W*a+(1-W)*b$. The function g is a function that derives ambiguity A of the I-E model's recommendation. As mentioned above, the parameter $C_h$ is the number of the I-E model's recommendations, so that the ambiguity A is determined based on the parameter $C_h$. The function g meets conditions below: the output of the function g increases as the parameter $C_h$ increases (except the case of $C_h=0$); and the ambiguity A will be determined based on the system's policy when the I-E processor 120 (the I-E model) does not return any I-E model's recommendations ($C_h=0$). As mentioned above, if the recommendation system 100 allows the false-positive and is wanted to return recommendations whenever possible, the function g returns a high score R in the case of $C_h=0$. If the recommendation system 100 does not prefer the false-positive and is wanted to reduce wrong recommendations, the function g returns a low score R in the case of $C_h=0$. For example, if $C_h>0$, $g(C_h)=G_1*C_h$. Further, if $C_h=0$, $g(C_h)=G_2$. Note that $G_1$, $G_2$ are constants.

Figure 2:
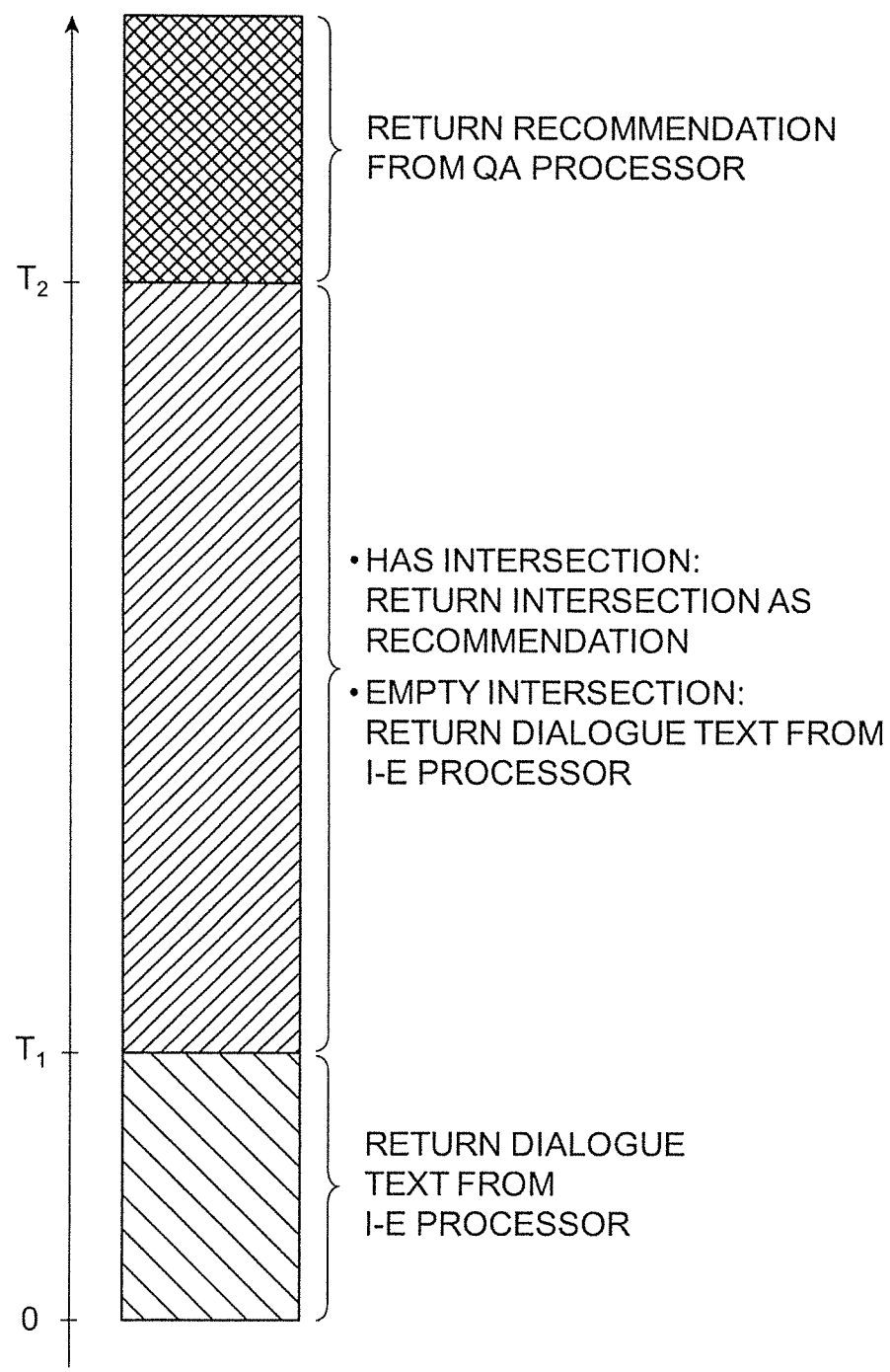
FIG. 2 is a diagram showing relationship between the QA reliability score and the thresholds.

FIG. 2 is a diagram showing relationship between the QA reliability score R and the thresholds $T_1$, $T_2$.

Referring to FIGS. 1 and 2, the relationship between the QA reliability score R and the thresholds $T_1$, $T_2$ will be described. As mentioned above, the evaluator 150 compares the QA reliability score R with the thresholds $T_1$, $T_2$ ($>T_1$) to determine the recommendation candidate(s). The thresholds $T_1$, $T_2$ are determined based on characteristics of the I-E processor 120 and the QA processor 130.

If the QA reliability score R is lower than the threshold $T_1$, the evaluator 150 returns the dialogue text from the I-E processor 120. If the QA reliability score R is equal to or higher than the threshold $T_2$, the evaluator 150 returns recommendations (the QA system's recommendation) from the QA processor 130.

If the QA reliability score R is equal to or higher than the threshold $T_1$ and lower than the threshold $T_2$, the evaluator 150 determines an intersection between the QA system's recommendation and the I-E model's recommendation. That is to say, the evaluator 150 determines whether a common recommendation candidate exists or not. If the intersection exists (if the evaluator 150 has the intersection), the evaluator 150 returns the intersection as a recommendation candidate. On the other hand, if the intersection does not exist (the evaluator 150 has an empty intersection), the evaluator 150 returns the dialogue text from the I-E processor 120. Note that a range between the threshold $T_1$ and the threshold $T_2$ is an example of the claimed predetermined range.

In the present exemplary embodiment, the evaluator 150 may determine the recommendation candidate(s) based on the outputs from the I-E processor 120 and the QA processor 130. This enables to minimize cases where no recommendation candidate is gained by the recommendation system 100. That is to say, with the simultaneous use of multiple systems (the I-E models and the QA system), the recommendation system 100 of the present exemplary embodiment is more robust than one that uses only the QA system. Note that the I-E model-based conversation flow is more robust and easier to maintain than the QA system. And the QA system can provide a very specific answer if the input query has informative conditions.

Figure 3:
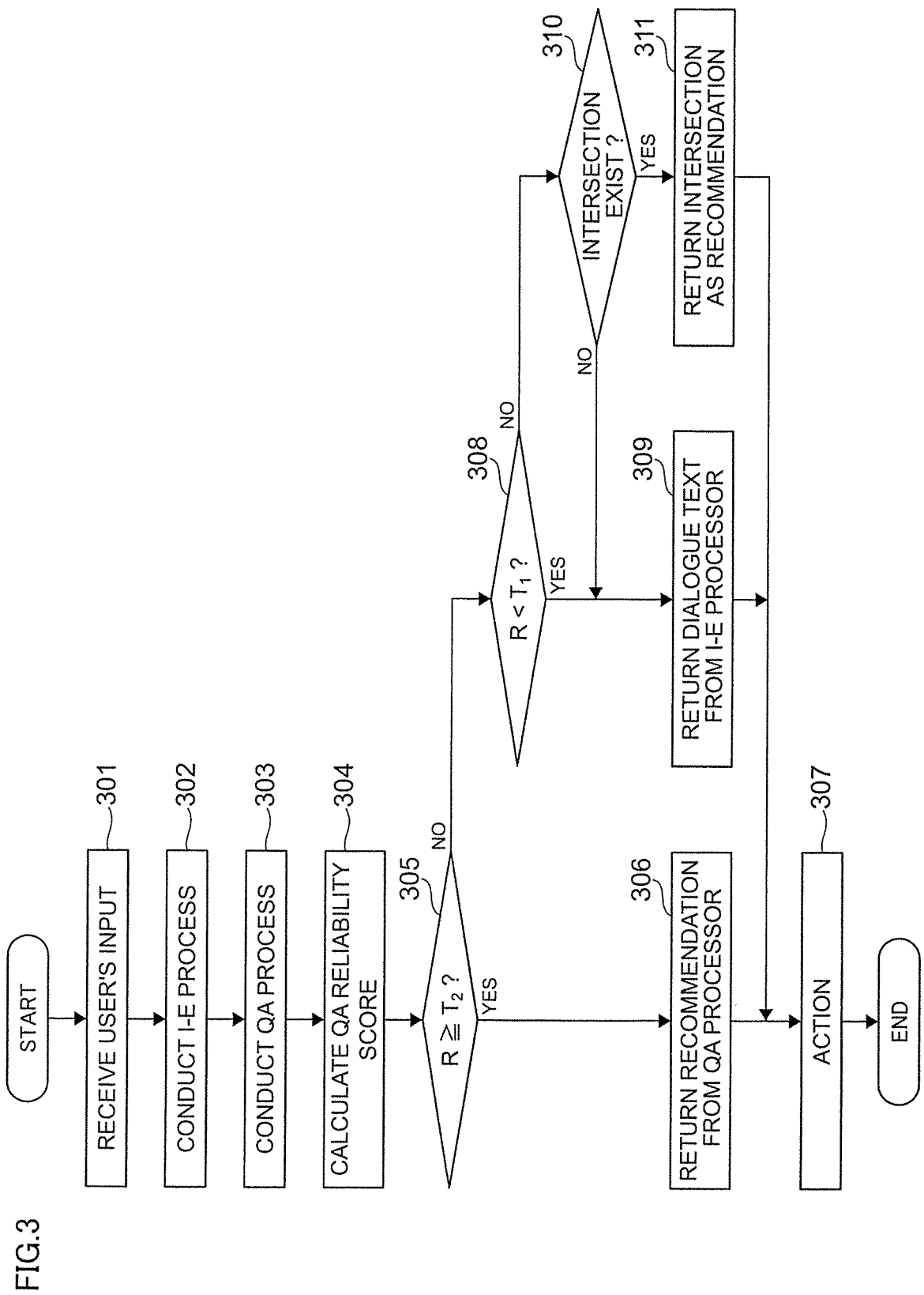
FIG. 3 is a flowchart of an operation of the recommendation system according to the exemplary embodiment.

FIG. 3 is a flowchart of an operation of the recommendation system 100 according to the exemplary embodiment.

Referring to FIGS. 1 and 3, the operation of the recommendation system 100 will be explained. The receiver 110 first receives a user's input in natural language (step 301). The I-E processor 120 then processes the user's input using the I-E model (step 302), and the QA processor 130 processes the user's input using the QA system (step 303). The QA reliability calculator 140 then calculates the QA reliability score R based on the outputs from the I-E processor 120 and the QA processor 130 (step 304). The evaluator 150 then evaluates the calculated QA reliability score R (steps 305, 308, 310).

Specifically, if the calculated QA reliability score R is equal to or higher than the threshold $T_2$ (Yes in step 305), the evaluator 150 returns the QA system's recommendation (step 306). The action module 160 then conducts the action (step 307).

If the calculated QA reliability score R is lower than the threshold $T_2$ (No in step 305), the evaluator 150 compares the QA reliability score R and the threshold $T_1$ (step 308). If the calculated QA reliability score R is lower than the threshold $T_1$ (Yes in step 308), the evaluator 150 returns the dialogue text from the I-E processor 120 (step 309).

If the calculated QA reliability score R is equal to or higher than the threshold $T_1$ (No in step 308), the evaluator 150 determines the intersection between the QA system's recommendation and the I-E model's recommendation (step 310). If the intersection exists (Yes in step 310), the evaluator 150 returns the intersection as the recommendation candidate (step 311). If the intersection does not exist (No in step 310), the evaluator 150 returns the dialogue text from the I-E processor 120 (step 309).

Here, in the present exemplary embodiment, the recommendation system 100 basically uses the output from the I-E processor 120. If the number of the conditions in the query is large and the QA system's recommendation is found, the recommendation system 100 exceptionally uses the output from the QA processor 130. In other words, the recommendation system 100 determines to use the QA system's recommendation based on contents of the user's input and the analysis result from the QA processor 130. Note that the user can receive the QA system's recommendation without any specific operation by the user. That is to say, the QA system's recommendation is seamlessly incorporated into the dialog flow of the I-E processor 120.

Hereinafter, referring to FIGS. 1 and 3, an example of the operation of the recommendation system 100 will be explained in detail. The example assumes that the recommendation system 100 recommends restaurants in a specific area (e.g. in a specific building) according to a free natural language query of the user's input such as "I want to have . . . ."

Firstly, the receiver 110 receives the user's input. The intent matching module 121 and the entity matching module 123 of the I-E processor 120 then define entities and an intent. The entities may contain categories of restaurants (e.g. French, Japanese) and their representative foods or drinks (e.g. wine, sashimi). The intents are such as "recommend a restaurant" (for the query such as "I want to go to a restaurant which serves beer"), "provide basic information" (for the query such as "how many restaurants in this building?") and "toilet" ("where is the bathroom?"). Further, a machine learning model is trained so that the closest intent to the query may be returned from the processor 120.

In the present exemplary embodiment, the conditional branching module 125 designs a conversation flow using the defined intents and the defined entities. For example, when the query contains a word of a category of restaurants (e.g. "French"), the conditional branching module 125 can respond by showing the number of restaurants in the category (e.g. "There are three (3) French restaurants."). The action module 160 can (i) navigate the user to the restaurant (when the number of the restaurants is one (1)), (ii) enumerate the restaurants and prompt the user to select one of them (when the number of the restaurants is less than four (4)), or (iii) prompt the user to add more keywords to narrow down the restaurants (when the number of the restaurants is four (4) or more).

As the I-E processor 120 processes the query, the QA processor 130 also processes the query. Specifically, the query analysis module 131 extracts keywords from the query. The search module 133 then retrieves candidate restaurants by using the detailed information of candidate restaurants (a list of foods, advertising, and other metadata on the restaurant). The evidence matching module 135 then calculates the confidence scores for the respective candidate restaurants.

As mentioned above, the QA reliability calculator 140 gets the outputs from the two subsystems (the I-E processor 120 and the QA processor 130) and calculates the QA reliability score R. For example, the QA reliability calculator 140 gains the score R by the QA reliability function $(R=C_c*Q_n*\{g(C_h)+w(Q_c, f(Q_e, Q_m))\})$. Based on the calculated score R, the evaluator 150 determines the recommendation or continues the conversation flow. The action module 160 then conducts actions according to the decision of the evaluator 150.

In this example, the recommendation system 100 employs the QA reliability function below and uses threshold values $T_1=50$ and $T_2=100$.

$$R=C_c*Q_n*\{2C_h+10Q_c+10(Q_m^3/Q_e)\}(C_h>0)$$

$$R=C_c*Q_n*\{10+10Q_c+10(Q_m^3/Q_e)\}(C_h=0)$$

In this example, the I-E processor 120 returns $C_c=0$ if the I-E processor 120 determines that the query is not suitable for the QA processor 130 (the QA system). The I-E processor 120 returns $C_c=1$ for other cases. Further, the above QA reliability function is intended to assign a high score R to the QA processor 130 in the case where: the I-E processor 120 returns many recommendation candidates and it requires great care to narrow down the recommendation candidates, or the QA system's recommendation satisfies many conditions that are extracted from the query.

Hereinafter, as a working example 1, a case where the recommendation system 100 receives a user's input 1 "I'd like to go to a French restaurant." will be described. In this case, the I-E processor 120 identifies that the intent of the user's input 1 matches the entity "French restaurant" and returns five (5) recommendation candidates ($C_h$=5). Further, the QA processor 130 executes the query by using one (1) condition ($Q_e$=1, category: "French"), and then returns the recommendation candidates with the confidence factors and the reasons. Note that the words "restaurant", "go", etc. in the user's input 1 have no meaning in the query; that is to say, these words are noises in the user's input. This working example 1 assumes that the top recommendation candidate (e.g. the recommendation that has the highest confidence factor) has $Q_c$=0.6 and $Q_m$=1. Then, the score R becomes 26. In this case, the score R is lower than the threshold $T_1$ (R (=26)<$T_1$ (=50)), so that the recommendation system 100 (the evaluator 150) returns the dialogue text from the I-E processor 120 (refer to step 309 in FIG. 3). For example, the recommendation system 100 returns a number of French restaurants and prompts the user for additional conditions (keywords) to narrow down the recommendations.

Next, as a working example 2, a case where the recommendation system 100 receives a user's input 2 "Are there any reasonable watering places where I can smoke?" will be described. In this case, the I-E processor 120 does not identify any intent and entities ($C_h$=0) of the user's input 2 matching the lists of intents and entities, and prompts the user to provide another request. Further, the QA processor 130 executes the query by using three (3) conditions ($Q_e$=3, keyword: "drinking place" and conditions: "reasonable", "can smoke"), and then returns the recommendation candidates with the confidence factors and the reasons. This working example 2 assumes that the top recommendation candidate has $Q_c$=0.8 and $Q_m$=3. Then, the score R becomes 108. In the working example 2, the score R is higher than the threshold $T_2$ (R (=108)>$T_2$ (=100)), so that the recommendation system 100 (the evaluator 150) returns the QA system's recommendation (refer to step 306 in FIG. 3). For example, the recommendation system 100 returns the restaurant, bar, etc. which has the highest confidence factor. Further, the recommendation system 10 provides the reasons if needed. For example, the reasons are data on the average price and descriptions of alcohol offered at the restaurant.

Next, as a working example 3, a case where the recommendation system 100 receives a user's input 3 "I want to go to a reasonable Japanese restaurant where they have many kinds of Japanese Sake." will be described. In this case, the I-E processor 120 identifies that the user's input 3 matches the entity "Japanese restaurant" and returns twenty-four (24) recommendation candidates ($C_h$=24). Further, the QA processor 130 executes the query by using five (5) conditions ($Q_e$=5, category: "Japanese", keywords: "Sake", "kinds", "many", and condition: "reasonable"), and then returns the recommendation candidates with the confidence factors and the reasons. This working example 3 assumes that the top recommendation candidate has $Q_c$=0.8 and $Q_m$=3. Then, the score R becomes 110. In the working example 3, the score R is higher than the threshold $T_2$ (R (=110)>$T_2$ (=100)), so that the recommendation system 100 (the evaluator 150) returns the QA system's recommendation (refer to step 306 in FIG. 3). For example, the recommendation system 100 recommends the restaurant which has the highest confidence factor, and provides the reasons if needed.

Next, as a working example 4, a case where the recommendation system 100 receives a user's input 4 "I want to eat reasonable Italian foods." will be described. In this case, the I-E processor 120 identifies that the user's input 4 matches the entity "Italian food" and returns five (5) recommendation candidates ($C_h$=5). Further, the QA processor 130 executes the query by using two (2) conditions ($Q_e$=2, category: "Italian" and condition: "reasonable"), and then returns the recommendation candidates with the confidence factors and the reasons. This working example 4 assumes that the top recommendation candidate has $Q_c$=0.8 and $Q_m$=2. Then, the score R becomes 58. In the working example 4, the score R is higher than the threshold $T_1$ and lower than threshold $T_2$ ($T_1$ (=50)<R (=58)<$T_2$ (=100)), so that the recommendation system 100 (the evaluator 150) returns the intersection between the I-E model's recommendation and the QA system's recommendation (refer to step 311 in FIG. 3). For example, the QA reliability calculator 140 calculates the score R of each recommendation candidate by using candidate specific values ($Q_{c\_n}$ and $Q_{m\_n}$) instead of the system's values ($Q_c$=0.8 and $Q_m$=2), and may select the recommendation candidate(s) (e.g. three (3) recommendation candidates) from the QA processor 130 whose score R exceeds the threshold $T_1$ to evaluate the intersection.

Next, as a working example 5, a case where the recommendation system 100 receives a user's input 5 "Where is a bathroom?" will be described. In this case, the I-E processor 120 identifies that the user's input 5 matches the intent "toilet", so that the I-E processor 120 determines that the query is not suitable for the QA processor 130 (the QA system) and returns $C_c$=0. Then, the score R becomes 0. In this case, the score R is lower than the threshold $T_1$ (R (=0)<$T_1$ (=50)), so that the recommendation system 100 (the evaluator 150) returns the dialogue text from the I-E processor 120 (refer to step 309 in FIG. 3). For example, the recommendation system 100 provides guidance about the toilet.

Note that the recommendation system 100 can operate as a conversation system which can effectively give a recommendation to the user based on free conversation. The conversation system has following features: when the user's input and the information source match (e.g. what the user needs and what the shop sells), the specific thing (candidate) can be recommended; the evidence of matching (i.e. matching conditions which suggest why the recommendation system 100 recommends the specific candidate) can be displayed; the interactive conversation can prompt the user to provide a more specific query when the user's input is so simple that the recommendation system 100 cannot recommend the specific thing; the recommendation system 100 can narrow down the candidates taking the intersection of the output from the I-E processor 120 and the QA processor 130; the recommendation system 100 can minimize cases where the recommendation system 100 outputs no candidate; two different systems can be integrated with relatively low cost because existing systems may be applicable to the I-E processor 120 and the QA processor 130 without modification.

Figure 4:
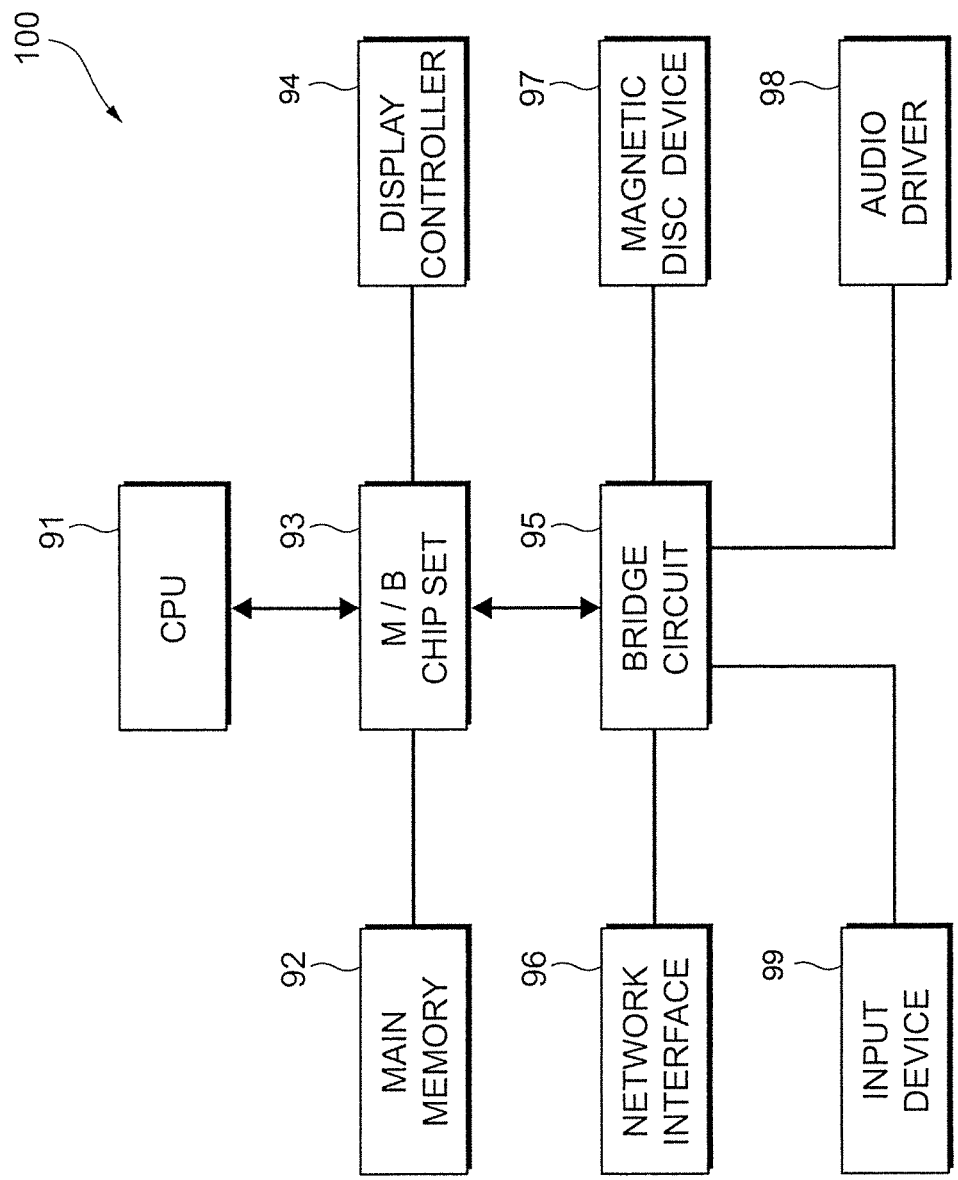
FIG. 4 depicts an example of a hardware configuration of the recommendation system in the exemplary embodiments.

FIG. 4 depicts an example of a hardware configuration of the recommendation system 100 in the exemplary embodiments.

Referring to FIG. 4, a hardware configuration of the recommendation system 100 will be described in detail. As shown in FIG. 1, the recommendation system 100 may include a central processing unit (CPU) 91, a main memory 92 connected to the CPU 91 via a motherboard (M/B) chip set 93, and a display driver 94 connected to the CPU 91 via the same M/B chip set 93. A network interface 96, a magnetic disk device 97, an audio driver 98, and an input device 99, e.g., keyboard/mouse, are also connected to the M/B chip set 93 via a bridge circuit 95.

In FIG. 4, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the input device 99 to the bridge circuit 95, a universal serial bus (USB) may be used.

Note that the recommendation system 100 is not required to be configured as a single unit. Each component (e.g. the I-E processor 120, the QA processor 130) may be provided at different places, and may be connected to each other via a network such as the Internet, a local area network, a wide area network, and a wireless network.

In the above explanation, the QA reliability function is described as $R=C_c*Q_n*\{g(C_h)+w(Q_e, f(Q_e, Q_m))\}$. This formula is an example and the QA reliability function is not limited to any specific function.

In the above explanation, the evaluator 140 evaluates the outputs from the I-E processor 120 and the QA processor 130 using the multiple thresholds $T_1$, $T_2$. The number of the thresholds is not limited to any number. Further, the evaluator 140 may use a single threshold $T_0$ for the evaluation. For example, if the QA reliability score R is equal to or higher than the threshold $T_0$, the evaluator 150 returns recommendations from the QA processor 130. And if the QA reliability score R is less than the threshold $T_0$, the evaluator 150 returns the dialogue text from the I-E processor 120.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing a recommendation, comprising:
   receiving, by a conversation system, a query from a user;
   inputting the query into an intent-entity model to obtain a first output;
   inputting the query into a question-answering system to obtain a second output;
   analyzing the first output from the intent-entity model to calculate a value of degree of ambiguity of the first output to the query;
   analyzing the query and the second output from the question-answering system to calculate a value of extent of satisfaction to which the second output satisfies the query;
   calculating a reliability score based on the value of the degree of ambiguity of the first output and the value of extent of satisfaction to which the second output satisfies the query;
   determining one or more recommendations by comparing the reliability score to a first threshold and to a second threshold, wherein an intersection of the first output and the second output is selected as the one or more recommendations, responsive to a determination that the reliability score is between the first threshold and the second threshold; and
   outputting the one or more recommendations to the user.

2. The computer-implemented method according to claim 1, further comprising calculating complexity of the query by counting a number of conditions extracted from the query, wherein calculating reliability score includes using the complexity of the query.

3. The computer-implemented method according to claim 2, wherein calculating the reliability score includes using the complexity of the query, the degree of ambiguity, and the extent of satisfaction, wherein determining one or more recommendations includes selecting one or more recommendations being found both in the first output and the second output in response to the reliability score being within a predetermined range.

4. The computer-implemented method according to claim 1, wherein the calculating the reliability score includes using a first confidence factor of the conversation system and a second confidence factor of the question-answering system in addition to a complexity of the query, the extent of satisfaction, and the degree of ambiguity.

5. The computer-implemented method according to claim 1, wherein the second output from the question-answering system includes one or more recommendations and a reason for the recommendation to be outputted to the user.

6. A recommendation system comprising:
   a receiver configured to receive a query from a user;
   a conversation processor configured to apply an intent-entity model, and to determine a first output based on the query;
   a question-answering processor configured to determine a second output based on the query;
   an analyzer configured to calculate a value of degree of ambiguity of the first output to the query, and to calculate a value of extent of satisfaction to which the second output satisfies the query;
   an evaluator configured to calculate a reliability score based on the value of the degree of ambiguity of the first output and the value of extent of satisfaction to which the second output satisfies the query;
   a determinator configured to determine one or more recommendations by comparing the reliability score to a first threshold and to a second threshold, wherein an intersection of the first output and the second output is selected as the one or more recommendations, responsive to a determination that the reliability score is between the first threshold and the second threshold; and
   an outputter configured to output the one or more recommendations to the user.

7. The recommendation system according to claim 6, further comprising a calculator configured to calculate a complexity of the query by counting a number of conditions extracted from the query, wherein the evaluator uses the complexity of the query in addition to the degree of ambiguity and the extent of satisfaction when calculating the reliability score.

8. The recommendation system according to claim 7, wherein the evaluator calculates the reliability score by using the complexity of the query, the degree of ambiguity, and the extent of satisfaction, and the determinator selects one or more recommendations being found both in the first output and the second output in response to the reliability score being within a predetermined range.

9. The recommendation system according to claim 7, wherein the evaluator is further configured to use a first confidence factor of the conversation processor and a second confidence factor of the question-answering processor in addition to the complexity of the query, the extent of satisfaction, and the degree of ambiguity, to calculate the reliability score.

10. The recommendation system according to claim 6, wherein the second output from the question-answering processor includes one or more recommendations and a reason for the recommendation to be outputted to the user.

11. A computer program product for providing a recommendation, the computer program product comprising a non-transitory computer readable storage medium having program instructions embodied therewith, the program instructions executable by a computer to cause the computer to:
receive, by a conversation system, a query from a user;
input the query into an intent-entity model to obtain a first output;
input the query into a question-answering system to obtain a second output;
analyze the first output from the intent-entity model to calculate a value of degree of ambiguity of the first output to the query;
analyze the query and the second output from the question-answering system to calculate a value of extent of satisfaction to which the second output satisfies the query;
calculate a reliability score based on the value of the degree of ambiguity of the first output and the value of extent of satisfaction to which the second output satisfies the query;
determine one or more recommendations by comparing the reliability score to a first threshold and to a second threshold, wherein an intersection the first output and the second output is selected as the one or more recommendations, responsive to a determination that the reliability score is greater than the threshold; and
output the one or more recommendations to the user.

12. The computer program product according to claim 11, wherein the program instructions are executable by a computer to further cause the computer to:
calculate complexity of the query by counting a number of conditions extracted from the query, wherein calculating the reliability score includes using the complexity of the query in addition to the degree of ambiguity and the extent of satisfaction.

13. The computer program product according to claim 12, wherein the program instructions are executable by a computer to further cause the computer to:
calculate the reliability score by using the complexity of the query, the degree of ambiguity, and the extent of satisfaction, wherein determining one or more recommendations includes selecting one or more recommendations being found both in the first output and the second output in response to the reliability score being within a predetermined range.

14. The computer program product according to claim 12, wherein calculating the reliability score includes using a first confidence factor of the conversation system and a second confidence factor of the question-answering system in addition to the complexity of the query, the extent of satisfaction, and the degree of ambiguity.

15. The computer program product according to claim 11, wherein the second output from the question-answering system includes one or more recommendations and a reason for the recommendation to be outputted to the user.

* * * * *